United States Patent
Tynderfeldt et al.

(10) Patent No.: US 8,339,982 B2
(45) Date of Patent: Dec. 25, 2012

(54) METHOD AND DEVICE FOR POWER REDUCTION IN AN LTE SYSTEM

(75) Inventors: Tobias Tynderfeldt, Solna (SE); Jacob Osterling, Jarfalla (SE); Hannes Ekstrom, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 390 days.

(21) Appl. No.: 12/679,681

(22) PCT Filed: Sep. 28, 2007

(86) PCT No.: PCT/SE2007/050689
§ 371 (c)(1),
(2), (4) Date: Mar. 24, 2010

(87) PCT Pub. No.: WO2009/041871
PCT Pub. Date: Apr. 2, 2009

(65) Prior Publication Data
US 2010/0195501 A1 Aug. 5, 2010

(51) Int. Cl.
*G01R 31/08* (2006.01)
*G08C 17/00* (2006.01)
*H04J 3/00* (2006.01)
*H04B 7/01* (2006.01)
*H01Q 11/12* (2006.01)

(52) U.S. Cl. ........ 370/252; 370/311; 370/330; 370/336; 370/345; 455/13.4; 455/127

(58) Field of Classification Search .......................... None
See application file for complete search history.

(56) References Cited

U.S. PATENT DOCUMENTS

| | | | | |
|---|---|---|---|---|
| 5,729,538 A | * | 3/1998 | Dent | 370/347 |
| 5,740,165 A | * | 4/1998 | Vannucci | 370/330 |
| 7,729,716 B2 | * | 6/2010 | Camp, Jr. | 455/522 |
| 2007/0067164 A1 | | 3/2007 | Goudar | |
| 2009/0282277 A1 | * | 11/2009 | Sedarat et al. | 713/320 |

FOREIGN PATENT DOCUMENTS

| | | |
|---|---|---|
| EP | 1548989 A2 | 6/2005 |
| WO | 97/29571 | 8/1997 |

OTHER PUBLICATIONS

TSG-RAN WG1 #49bls, "Idle subframes for TDD,", R1-073040, Orlando, Jun. 21-25, 2007, 2 pages.

* cited by examiner

*Primary Examiner* — Nittaya Juntima
(74) *Attorney, Agent, or Firm* — Coats & Bennett, P.L.L.C.

(57) ABSTRACT

A method (600) for use in a wireless communications system (100) in which there is at least a first node (110) which controls the traffic to and from user terminals (130, 140) in a cell (120) within the system, so that there is downlink traffic in the system. The first node (110) transmits downlink traffic in radio frames, each of which comprises sub-frames. The first node (110) performs measurements on pre-defined system indicators in at least the first cell (120), and based on the results of the measurements, the first node is allowed to autonomously decide (615) to vary the number of available down link sub-frames used for down link traffic in the down link radio frames and also to vary (620) the content of the down link sub frames which are used, the decision being valid (625) for a time which is specified by the first node (110).

25 Claims, 7 Drawing Sheets

METHOD AND DEVICE FOR POWER REDUCTION IN AN LTE SYSTEM

TECHNICAL FIELD

The present invention discloses a method and a device for power reduction in a wireless communications system.

BACKGROUND

In a wireless communications system such as, for example, a system of the LTE (Long Term Evolution) kind, there will be one or more controlling nodes, so called base stations, sometimes referred to as eNodeB, depending on the specific kind of system. One role for a base station is to control all traffic to and from user terminals within a certain geographic area in the system, a so called cell.

A base station in a cellular system will comprise one or more transmitters, each of which in turn comprises one or more power amplifiers, PAs. The PAs are one of the main consumers of energy in a base station, since the PAs are used to amplify input signals with low input power to output signals with high output power, which is due to the fact that a high output power level is required to provide adequate coverage and high data rates in a cellular network.

A PA in an average base station has an output power of approximately 20 W and an efficiency level of around 20%, which means that approximately 100 W are needed in order to obtain a PA with an output power of 20 W. Reducing these power levels would thus mean major savings in energy, and would also lead to further savings in energy due to, inter alia, reduced cooling needs.

In many cellular systems, both those comprising an FDD (Frequency Division Duplex) mode and those comprising a TDD (Time Division Duplex) mode, the base stations transmit in so called radio frames, each of which will comprise a number of sub-frames.

As can be understood from the explanation given above, a reduction in the energy consumed by a PA in a wireless communications system would be highly beneficial, both in order to reduce operator expenditure (OPEX) and for environmental reasons. One way of achieving this would be to reduce the number of sub frames in which transmission is made from the base station, or to reduce the transmission in certain sub frames. or entirely "shut down".

SUMMARY

Thus, as has emerged from the above, there is a need for a solution by means of which the energy consumed by a PA in a communications system could be reduced, particularly by means of identifying sub frames in which the transmissions could, at least temporarily, be reduced or perhaps entirely shut down. The solutions should also make it possible to utilize such sub frames for "full transmission", if and when such a need arises.

Such a solution is offered by the present invention in that it discloses a method for use in a wireless communications system in which there is at least a first node which controls the traffic to and from user terminals in a certain first geographical area, a cell, within the system.

In a system in which the invention is applied, there will thus be downlink traffic in the system, and the first node will transmit its downlink traffic in radio frames, each of which comprises a certain number of sub-frames.

According to the inventive method, measurements are performed on pre-defined system indicators in at least the first cell. Based on the results of said measurements, a decision is made to vary the number of available down link sub-frames which are used by the first node for the transmission of down link traffic in said down link radio frames, a decision which is valid for a certain amount of time.

Suitably but not necessarily, the decision also comprises varying the content of the down link sub-frames which are used.

In one embodiment of the invention, the decision is made autonomously by the first node, including the length of the decision's validity, and in another embodiment, the results of the measurements are communicated to a central node in the system, with the central node taking the varying decision, including the length of the decision's validity, and communicates it to the first node for implementation.

Thus, in one embodiment of the inventive method, a base station of a cellular or other system may save energy in its PAs by varying the number of used downlink sub-frames by declaring some of them "idle", i.e. that no transmission will take place in those sub-frames, or a central node makes a corresponding decision for one or more base stations. Also, in one embodiment, the first node or the central node may decide to vary the number of used downlink sub-frames by means of declaring some of them "active", i.e. that transmission will take place in previously idle sub-frames.

The pre-defined system indicators which are measured, suitably by the first node, in order to decide how to use the available sub frames in the down link can include the system load in the first cell, so that, if the system load is below a certain threshold, a certain amount of sub frames can be declared "idle", or, conversely, if the system load rises above a certain threshold, previously idle sub frames may be activated, i.e. used for transmission. The pre-defined system indicators may also include the system load in at least one other cell in the system, as well as the interference level in the first cell. Another possible such system indicator may include the interference in the first cell.

The invention also discloses a transceiver which could be used as an eNodeB in a system of the invention.

BRIEF DESCRIPTION OF THE DRAWINGS

The invention will be described in more detail in the following, with reference to the appended drawings, in which.

DETAILED DESCRIPTION

Figure 1:
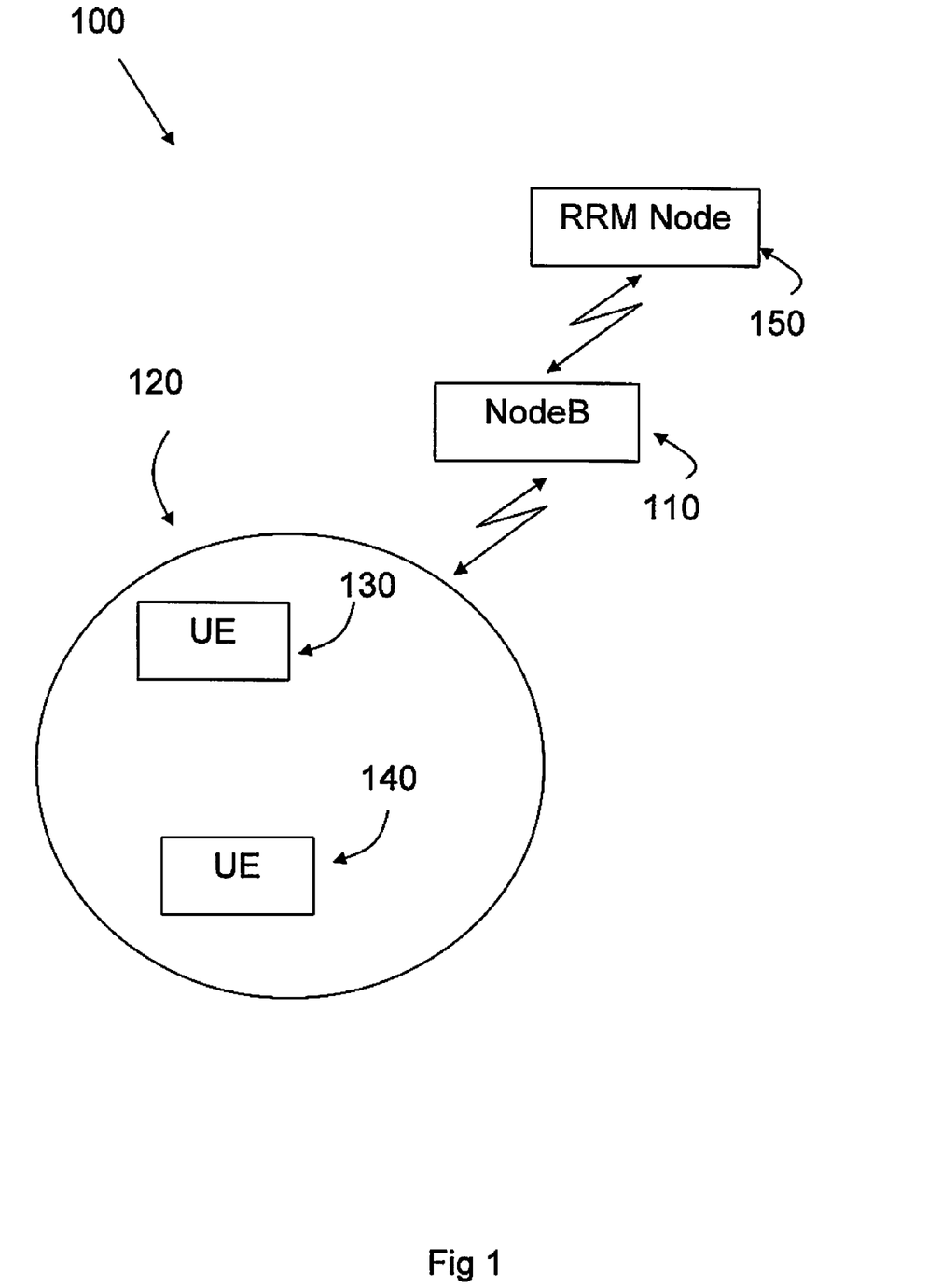
FIG. 1 shows an overview of a system in which the invention can be applied.

FIG. 1 shows a schematic overview of a part of a system 100 in which the invention may be applied. As has been explained above, the invention is primarily intended for a wireless cellular LTE system which has been configured to use either the TDD or FDD mode, so references below to one of those principles should merely be seen as examples intended to facilitate the reader's understanding of the invention.

In addition, the invention may also be applied to other kinds of wireless transmission systems, which are not cellular.

Returning now to FIG. 1, the system 100 shown in FIG. 1 comprises at least one base station 110, usually referred to as eNodeB in LTE. This base station may also be seen as a first node in the system 100, and has as one of its tasks to control traffic to and from user terminals in a certain geographical area 120 in the system, such an area being referred to as a cell. In FIG. 1, two user terminals, UEs, are symbolically shown as 130 and 140. The number of UEs within a cell is of course an example only.

As shown in FIG. 1, the system 100 may also comprises a central node 150, which has as one of its tasks to control the function of one or more of the eNodeBs in the system 100. An example of such a node may be a so called RRM-Node, Radio resource Management Node, which has among its tasks the carrying out of RRM algorithms which demand multi-cell knowledge in order to improve the system performance.

In the system 100 for which the invention is intended, the transmissions from the base station 110 to the UEs, the so called downlink, DL, direction for traffic in the cell 120, is divided into so called radio frames, each of which comprises a certain number of so called sub frames.

As an example, the radio frame of Frame Structure 1 in E-UTRAN consists of 10 sub-frames, each of 1 ms duration, and each sub-frame consists of 2 slots of 0.5 ms duration and 7 OFDM symbols. 12 sub-carriers of 15 kHz in the frequency domain and 0.5 ms duration are defined as one Resource Block.

As is known to those skilled in the field, the following can be said about a Radio Frame:

Reference Symbols are placed in each resource block of a radio frame.

The PDCCH (Physical DL Control Channel, used for signalling both downlink scheduling assignments and uplink scheduling grants) is spread over the whole carrier frequency and uses a variable amount of resources (1-3 OFDM symbols) in each sub-frame.

The PBCH (Physical Broadcast Channel) is placed in the middle of the carrier (the centre 1.25 MHz) and appears in sub-frames 0 and 5 of each radio frame. This channel contains system information which is broadcast in the cell.

Another part of the system information is mapped onto the PDSCH. In this description, such information is denoted as the dynamic BCH or D-BCH.

The Primary Synch Channel, P-SCH1, appears on one OFDM symbol in the centre 1.25 MHz in sub-frames 0 and 5 of each radio frame.

The Secondary Synch Channel #1, S-SCH1, appears on one OFDM symbol in the centre 1.25 MHz in sub-frames 0 of each radio frame.

The Secondary Synch Channel #2, S-SCH2, appears on one OFDM symbol on the centre 1.25 MHz in sub-frames 5 of each radio frame.

In addition, the first few OFDM symbols that are used for PDCCH will also contain the PHICH, Physical HARQ Indicator Channel, which is used to convey acknowledgements or negative acknowledgements for the uplink HARQ protocol, with data being sent in the uplink and reception status is sent in the downlink.

Resources which are not explicitly listed in the bullet list above are understood to comprise resources which are used for the PDSCH (Packet Downlink Shared Channel), a channel which is used to send user data to the UEs served by the eNodeB. It should be pointed out that certain OFDM symbols contain only PDSCH.

It should be noted that the exact structure of the radio frames and the mapping of control and data channels onto the radio frames is an ongoing work in 3GPP. Hence, the description provided in this text is used merely as an example in order to further the reader's understanding of the invention, and it should be understood that variations in the radio frame structure may occur, with the invention being equally applicable to systems with radio frames with a structure other than the exact one described here.

Modern cellular packet-switched communication systems such as LTE systems, for which the invention is mainly intended, as well as HSPA (High Speed Packet Access) systems, which are both specified in 3GPP, employ a Hybrid ARQ (Automatic Repeat ReQuest) protocol in their respective MAC (Medium Access Control) layer. The basic functionality of the HARQ protocol is to correct block errors that occur over the air interface.

The HARQ protocols specified in LTE and HSPA utilize so-called HARQ processes to transfer the data. The HARQ processes are used to associate a potential retransmission to its original transmission in order to enable soft combining at the HARQ receiver. Only when the HARQ receiver has reported correct reception of the data sent on a HARQ process may it be used to transmit new data. Consequently, before the reception of a HARQ status report from the receiver, the HARQ sender cannot know if it should send new data or a retransmission of the "old data". In the meantime, it therefore, "stops and waits" until it knows the result of the transmission. In order to still be able to utilize the down link during these waiting periods, it is customary to use multiple parallel such HARQ processes.

Further, two main HARQ protocol modes exist:

1. Synchronous HARQ, in which potential retransmissions occur at a pre-determined time after the initial transmission. In this case, no HARQ process number needs to be transmitted, since the process number is implicitly identified by the time of its transmission. This type of operation has been chosen for the LTE uplink HARQ protocol.

2. Asynchronous HARQ, in which there is no strict timing relationship between a transmission and its retransmission. Instead, the HARQ process numbers are explicitly signalled in each information block. This type of operation has been chosen for the LTE downlink HARQ protocol.

Figure 2:
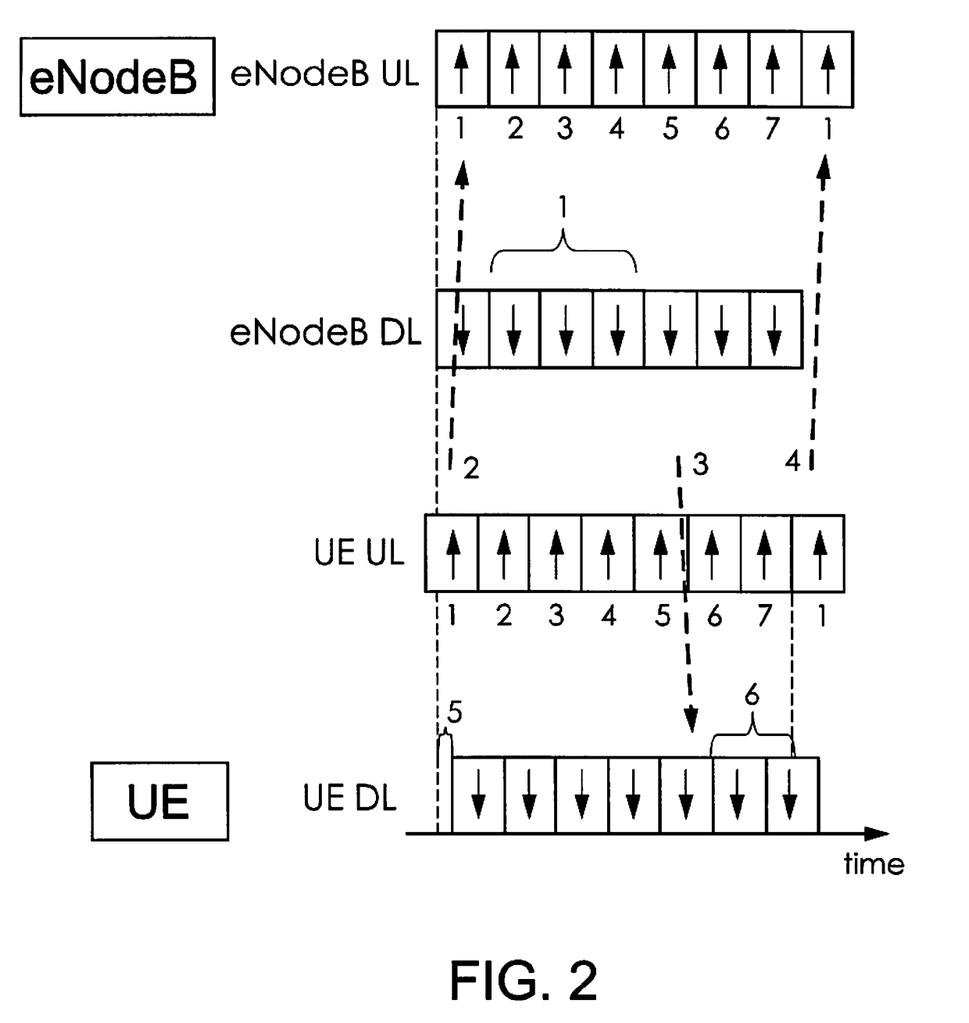
FIG. 2 shows a HARQ protocol.

Reference will now be made to FIG. 2 in order to exemplify the synchronous HARQ mode. In FIG. 2, the uplink HARQ sender, the UE, uses 7 parallel HARQ processes in a stop and wait fashion. The numbers below the UE uplink sub-frames in FIG. 2 show which HARQ process that is used for transmission in a particular sub-frame. Data from the different HARQ processes are sent in a "round-robin" fashion, making explicit signalling of process numbers unnecessary.

It should be pointed out that when using a HARQ protocol, transmission of data in one direction, in FIG. 2, uplink transmission, requires status signalling in the opposite direction, i.e. in the downlink direction in FIG. 2, as is indicated in the figure.

As has been pointed out initially in this text, in present day wireless cellular communications systems, it is a strong desire to reduce the power expenditure in the PAs in the base stations, which could suitably be done by limiting the number of downlink sub frames which are used by the PAs, or by limiting the extent to which the DL sub frames are used by the PAs.

However, in present solutions, it is difficult to find downlink sub-frames which could be "switched off", or declared idle, due to the wide variety of protocols/channels which need to be supported on the downlink frame structure.

A purpose of the present invention is to provide solutions which make it possible to "free" certain sub-frames from the need of communication, or at least to reduce the degree to which they are utilized In order to provide a solution to the problem of finding sub frames which may be declared idle, or have their content reduced, the present invention proposes a method by means of which a base station may autonomously, or as instructed by a central node in the system, declare certain sub-frames in one or more cells which it serves as "idle". In these idle sub-frames, no energy is transmitted from the base station, or a reduced amount of information is sent in them, by means of which the energy consumption is reduced.

According to the invention, in order to find sub frames which may be declared idle or have their information content reduced, measurements are performed, suitably by the base station, on certain pre-defined system indicators in at least a first cell, and, based on the results of these measurements, the base station is allowed to autonomously, decide to vary the number of available down link sub-frames which are used for the transmission of down link traffic in said down link radio frames and suitably also to vary the content of the down link sub frames which are used. The decision taken by the base station is allowed to be valid for a certain amount of time, which is also specified by the base station itself.

As an alternative, the decision to vary, including the validity of the decision, is taken by a central node in the system, and then communicated to the first node, the eNodeB, for implementation. In such an embodiment, the measurements are suitably carried out by the first node/eNodeB, and the results of the measurements are then communicated to the central node, which uses the results of the measurements to base its decision on. One example of a central node for such use is a so called RRM-node, as described previously in this text.

The measuring mechanism or mechanisms will be elaborated on in more detail later in this text, but briefly, the decision to vary the number of used downlink sub-frames may be done by declaring some of the sub-frames in question "idle", i.e. no transmission will take place in those sub-frames, or, conversely, the decision may also be that transmission will take place in previously idle sub-frames, if the system indicators which are measured indicate that this is suitable, or that there is a need for this.

As another alternative, instead of declaring one or more sub-frames idle, the amount of information sent in the sub-frame or frames may instead be reduced, in order to reduce the energy expenditure in those sub-frames. If such a "reduction mechanism" is introduced in a system of the invention, this could be done in the following manner: the information which is necessary in order to maintain the frame structure of a sub-frame is transmitted, including, for example, PDCCH, PHICH, and RS, but no data is actively scheduled for transmission, including any data which is scheduled on PDSCH, inclusive of page and D-BCH as well as data to UE:s which are waking up from DRX, and "regular data" which is associated with a scheduling assignment on PDCCH.

Turning now to the matter of the pre-defined system indicators which are measured, suitably by a function in the eNodeB in order to decide to vary the amount of used and contents of downlink sub-frames, one such indicator is suitably the system load in a cell of the eNodeB. (The expression "a cell" is used here, since one eNodeB may control one or more cells in a system.) One way to measure the system load for this purpose is to measure what percentage of the resources available to transmit user-data was actually used to transmit user data. This percentage can preferably be measured to reflect a time-average over a certain time interval. This indicator would then vary from 0 to 100%.

Thus, as an example, if the system load is below a certain threshold, the eNodeB on its own, or as instructed by a central node, may decide to declare a certain number of down-link sub frames as idle, and if the system load is below another lower threshold, an additional number of down-link sub-frames may be declared idle. Conversely, if a number of sub-frames are idle, and the system load rises above one or more thresholds, the number of idle down link sub frames may be reduced, suitably in steps, as the system load increases.

As an alternative or a complement to the system indicators which have been mentioned above, the pre-defined system indicators may also include the system load in at least one other cell in the system. This may then, as an example, be used in the following way: if one or more neighbouring cell or cells have a high load, sub-frames in the own cell are not declared as idle, so that UEs from the cells with a high load nay be handed over to the own cell.

An example of yet another possible pre-defined system indicator is the interference in the cell: if there is a high degree of interference in certain down-link sub-frames, those sub-frames may be declared idle, and the traffic may be diverted to other sub frames.

If the decision is made not to utilize certain sub-frames for downlink transmission, the eNodeB will, according to the invention, abstain from transmitting any of the following in those sub-frames:

The RSs (Reference Symbols) in the idle sub-frames will not be transmitted.

No control signalling mapped to the channels SCH (any of the primary or secondary), PCH or PBCH will be sent.

No other system information (D-BCH) will be sent.

No scheduling assignment for the downlink (with associated data) will be sent in the downlink sub-frames.

No scheduling grant for the uplink should be sent in the downlink sub-frames.

In addition, suitably, no data should have been scheduled in an uplink frame such that HARQ feedback is expected in a DL idle sub-frame, and preferably, no UE should have been configured to "wake up" from DRX during an idle DL sub-frame.

Furthermore, in yet another embodiment of the invention, no UE should have been configured to listen to a page on the PCH during such an idle DL sub-frame.

According to the invention, UEs that are served by the eNodeB in question are informed about which sub-frames that are idle in the cell, which may be done in the following manner:

For UEs that are active, i.e., UEs that are RRC_Connected in the cell at the time when the decision is made to declare one or more sub-frames idle (or declared active from an idle state) this can be achieved by means of RRC signalling, or via a broadcast message or SI signalling.

UEs that enter the cell as a result of a so called handover need to be informed about which sub-frames are idle/active before entering the cell. This can be done via the handover signalling (e.g., the Handover command message).

UEs which power on in the cell in question can receive this information (idle/active sub-frames) from the System Information.

The mechanisms used in order to make certain sub-frames idle, as described briefly above, will now be described in more detail:

No transmission of Reference Symbols, RSs:

In order for the PA of a eNodeB to be idle during a sub-frame, the PA should not need to amplify any signal containing RSs. Thus, the eNodeB, and consequently its PA does not transmit any RSs during idle sub-frames.

No Transmission of Control Signalling Such as SCH, PCH, P-BCH or D-BCH.

No control signalling such as SCH, PCH or P-BCH or D-BCH should be transmitted in idle sub-frames. The placement of control signalling such as SCH, PCH or P-BCH is typically standardized, so that its placement in the radio frame is static. The reason for this is that UEs entering the cell, or operating in some form of sleep mode, should know where and when to find the necessary information.

For example, SCH and P-BCH information is placed in sub-frames 0 and 5 according to the LTE standard, and for that reason, those sub-frames should, if possible, not be declared idle. Naturally, the numbers (0 and 5 in this example) of the sub-frames used for this control signalling may vary, in which case the sub-frames which should not be declared as idle will also vary.

No Scheduling Assignment for the Downlink (with Associated Data) should be Sent in the Downlink No scheduling assignment for the downlink, with associated data, should be sent in the downlink, which is controlled by the downlink scheduling function in the eNodeB. During idle frames, the downlink scheduler does not schedule transmission of any data.

No Scheduling Grant for the Uplink should be Sent in the Downlink

No scheduling grant for the uplink should be sent in the downlink, which should be controlled by the uplink scheduling function in the eNodeB. The uplink scheduler should not schedule any grants during sub-frames that have been declared idle.

No HARQ Feedback in Downlink

No data should have been scheduled in an uplink frame such that HARQ feedback is expected (by the UE) in a DL idle sub-frame, as controlled by the uplink scheduler function in the eNodeB.

However, one issue that needs to be considered here is that in a typical case, a HARQ feedback which arises from an original transmission and any potential HARQ retransmissions are not sent in the same sub-frame. This principle is shown in FIG. 3 for the case where the eNodeB has been configured to use 7 HARQ processes.

Figure 3:
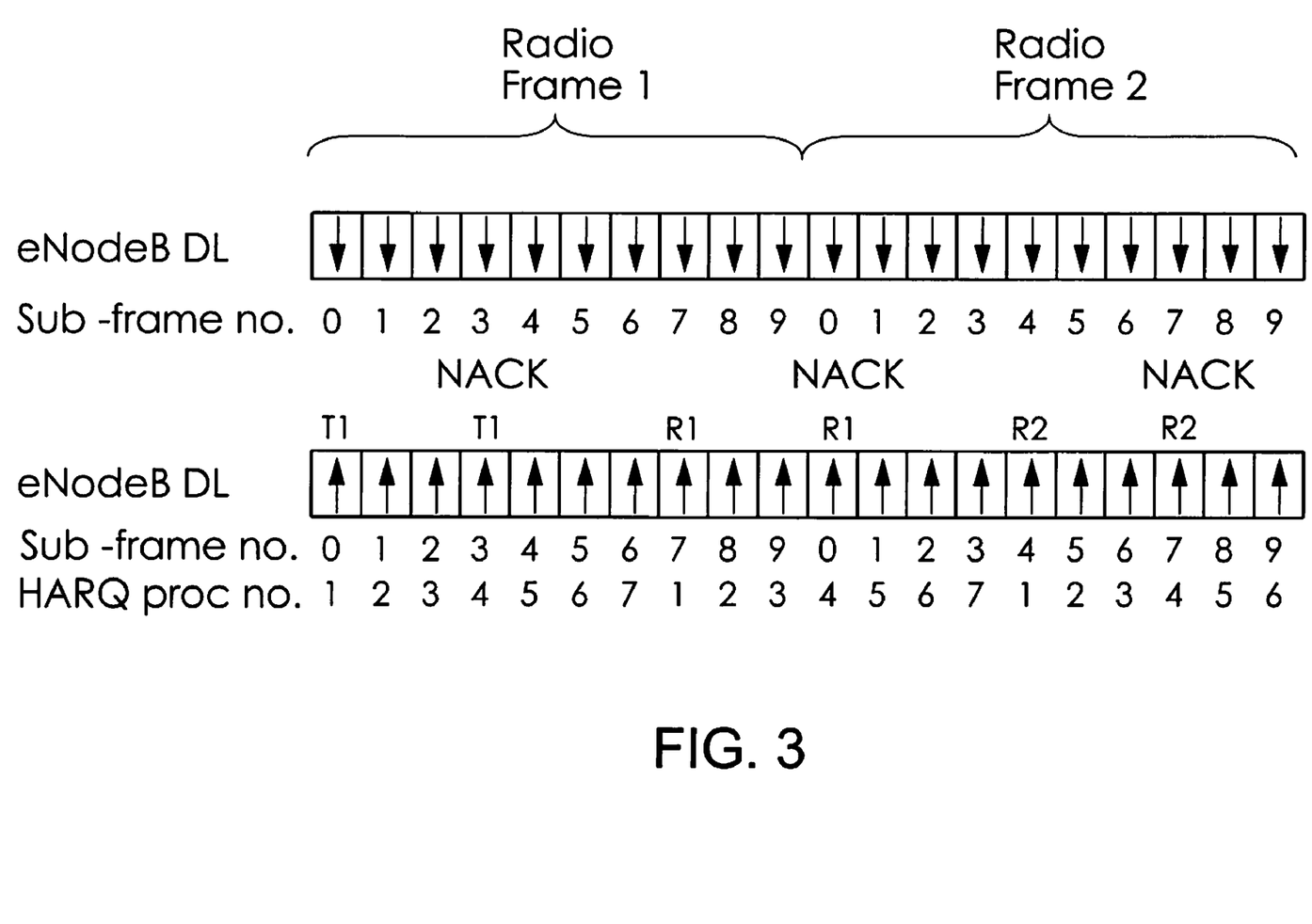
FIGS. 3-5 show HARQ signalling of one aspect of the invention.

In the example shown in FIG. 3, the eNodeB is assumed to need 3 TTIs in order to calculate the feedback. The figure shows the original transmission ("T1") and first two retransmissions ("R1" and "R2") that are sent on the uplink on HARQ process 1, and the associated HARQ feedback on the downlink is indicated as NACK T1, NACK R1 and NACK R2.

As is visible from the figure, the HARQ feedback is not sent in the same sub-frame number for the original transmissions and the subsequent retransmissions. Given this, it becomes increasingly difficult to introduce any idle sub-frames.

Although the exact processing times required in the eNodeB and the number of HARQ processes may differ compared to the assumptions made in this example, the principle of the problem highlighted in the example will exist in many of the possible configurations. One way of solving the problem described above is to:

1. Reconfigure the number of HARQ processes used in the uplink HARQ so that it is equal to the number of TTIs per sub-frame in which the eNodeB is allowed to give UL (UpLink) grants. This may involve reconfiguring a UE that moves between cells that have a different number of idle sub-frames per radio frame. In certain cases, this may also involve purging the HARQ buffers on the UE side if there is still data in the processes when the number of HARQ processes is decreased.

2. Provide the UE and the eNodeB with rules which provide a unique mapping between HARQ process and the HARQ feedback in the downlink. This rule or rules is/are preferably standardized.

Figure 4:
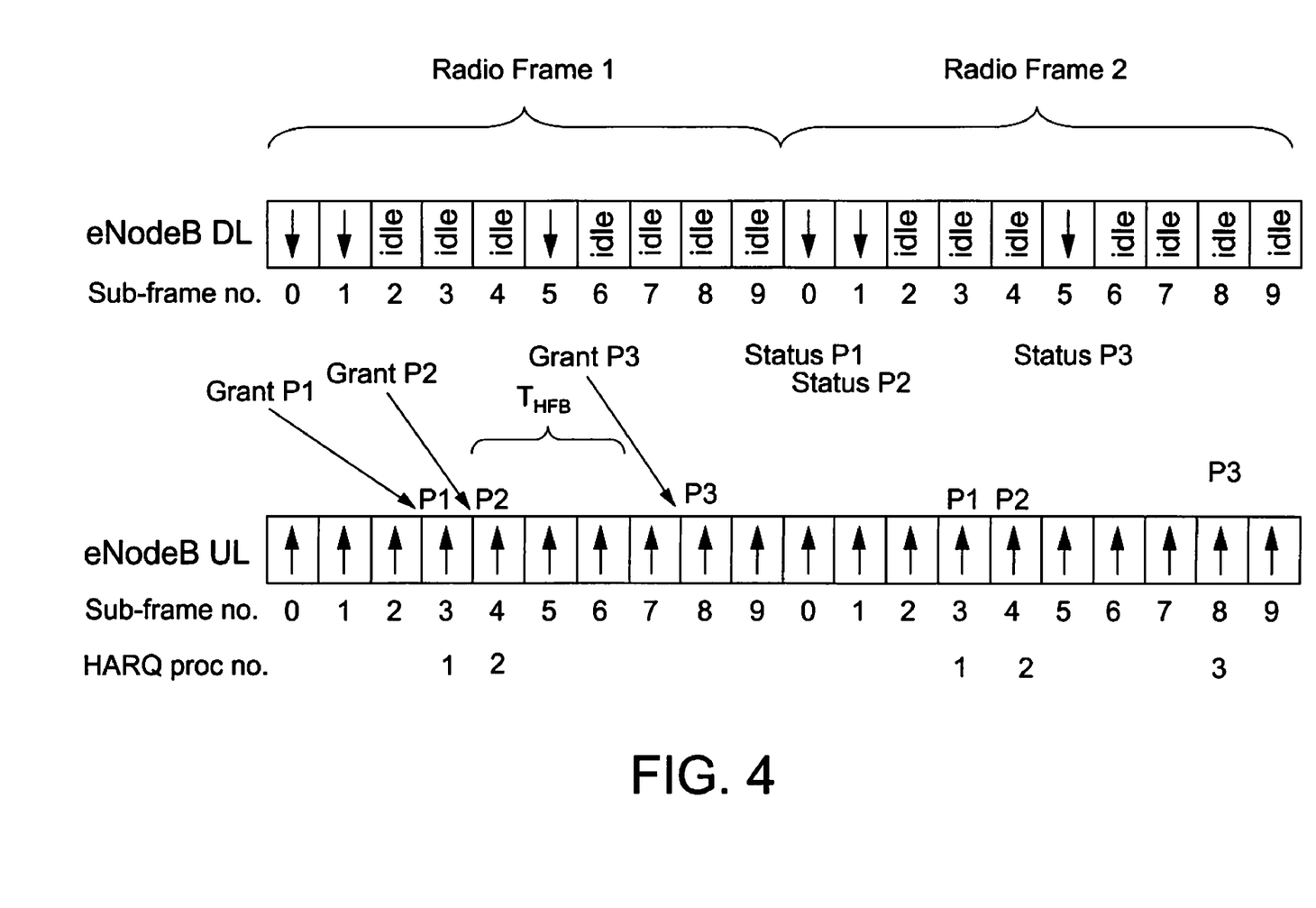

One example of the principle described in items 1 and 2 above is shown in FIG. 4. In the figure, downlink sub-frames 2, 3, 4, 6, 7, 8 and 9 have been declared idle by the eNodeB. Uplink scheduling grants can be sent in sub-frames 0, 1, and 5, and consequently, the UE has been configured with 3 uplink HARQ processes, as described above under the heading "No scheduling grant for the uplink should be sent in the downlink."

The uplink grant for HARQ process 1 is sent in downlink sub-frame number 0. During "normal" operation, i.e. without downlink idle frames, the corresponding HARQ feedback would have been expected after a delay of $T_{HFB}$, i.e., in downlink sub-frame 7 in FIG. 4. However, since that sub-frame has been declared as idle, the UE needs to find another sub-frame where the HARQ feedback is expected.

One possible way for the UE to calculate where the feedback should appear is to let the HARQ feedback appear in the next non-idle sub-frame following a delay of $T_{HFB}$ after transmission of the data, where no other HARQ process is waiting for HARQ feedback. This rule would also need to be shared by the eNodeB, so that the feedback is sent and received at the right time.

The part of the paragraph above which includes the feature that no other HARQ process is waiting aims at resolving the situation of HARQ process number 2 in the figure. The first non-idle sub-frame following a delay of more than $T_{HFB}$ would have been sub-frame 0. However, the HARQ feedback for HARQ process 1 is expected there, which is why HARQ process 2 needs to receive its feedback in sub-frame 1.

Thus, in a system which utilizes the present invention, it is possible and suitable to decrease the number of HARQ processes used for the uplink in relation to the number of sub-frames where the eNodeB is allowed to give uplink grants, and to also provide a unique mapping between HARQ process and the HARQ feedback in the downlink, as shown in the example of FIG. 4 and described above.

No "Wake-Up" from DRX

No UE should have been configured to "wake up" from DRX during an idle DL sub-frame.

A UE in DRX only "wakes up", i.e., switches on its transmitter and receiver, at predetermined time instances in order to save power. These time instances are known both at the UE and the eNodeB, and are configured by the eNodeB. At those time instances, the eNodeB may schedule data in the downlink to the UE. Hence, if a UE's wake-up period coincides with idle DL sub-frames, that UE would not be able to be contacted from the eNodeB. However, since the eNodeB determines which sub-frames that are to be idle, as well as configuring the "wake-up" times of the UEs, the eNodeB thus has all of the information necessary in order to configure the wake-up times so that they do not coincide with idle sub-frames.

In fact, it would also be possible to let the eNodeB comprise a mechanism to configure all UEs (in the cell or cells in question) DRX cycles so that their wake-up periods do not coincide with idle DL sub-frames. If such a solution is for some reason not feasible, e.g., the configuration mechanisms that are available under the standard used are not flexible enough, it would be possible to include a rule in the system for both the UES and the eNodeB which would state that "if the configured wake-up time instance coincides with an idle DL sub-frame, the next non-idle sub-frame following that idle sub-frame should count as the wake-up period".

No Paging Expected

No UE should have been configured to listen for a page during an idle sub-frame. Suitably, this is handled in the same manner as with the DRX—wake up situation, as described above.

An additional feature which is envisioned within the scope of the present invention is as follows:

As explained above, one purpose of the present invention is to reduce power consumption in the eNodeB by switching off the PA in certain "idle" DL sub-frames. In the UL, on the other hand, it is in principle still possible to utilize all sub-frames. Furthermore, for a UE that is power limited in the UL, i.e. is transmitting at maximum power, it is desirable to be able to transmit in as many UL sub-frames as possible.

Figure 5:
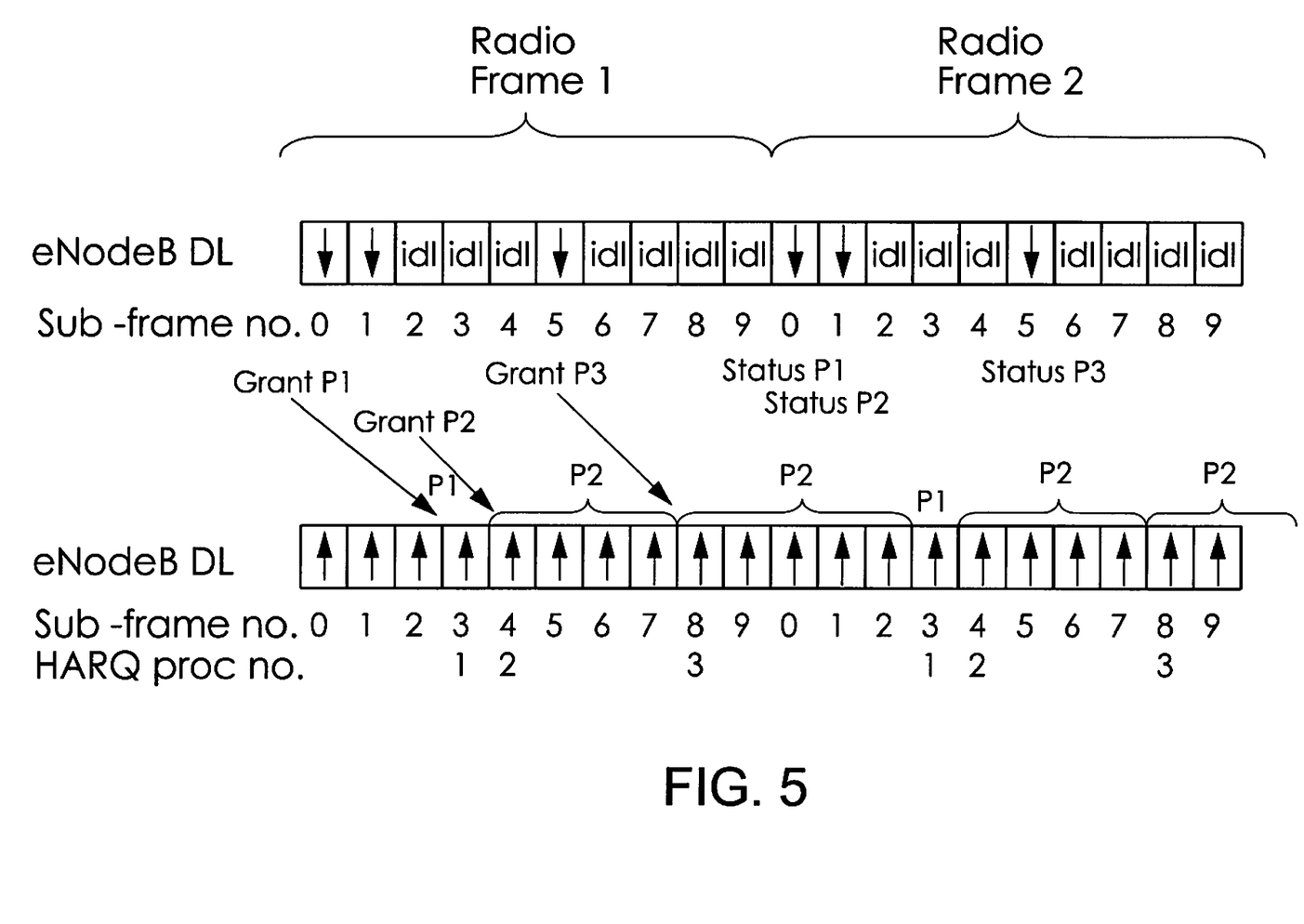

However, as explained above, it will only be possible to send UL grants and HARQ feedback during non-idle DL sub-frames. To still be able to allow a UE to transmit in any UL sub-frame, one solution would be to allow an UL scheduling grant to be valid for more than one UL sub-frame. This is illustrated in FIG. 5, where Grant P1 is valid for one UL sub-frame, Grant P2 is valid for 4 UL sub-frames and Grant P3 is valid for 5 sub-frames. Thus, the core of this feature is to allow UL grants for multiple TTIs.

The number of mechanisms described above for making sub-frames idle may also be used to reduce the transmissions in a DL sub-frame, if it is desired to maintain the sub-frame as active, but with a reduced content in order to obtain some degree of energy saving. In other words, another way of offered by the present invention reducing power consumption in an eNodeB is by switching off the PA in the eNodeB for a subset of the duration of an "active" DL sub-frame.

In one embodiment, the DL sub-frame content is varied such that the data which is to be transmitted on the PDSCH in a radio frame is concentrated to a subset of the subframes in said radio frame. Preferably, but not necessarily, this concentration is implemented in a scheduling function contained in the eNodeB. This concentration frees some subframes from PDSCH transmission. As previously noted, some OFDM symbols of a subframe contain only PDSCH transmission. Consequently, during such OFDM symbols in a subframe in which no PDSCH transmission occurs, the PA can be switched off during such an OFDM symbol, thereby giving energy savings.

Figure 6:
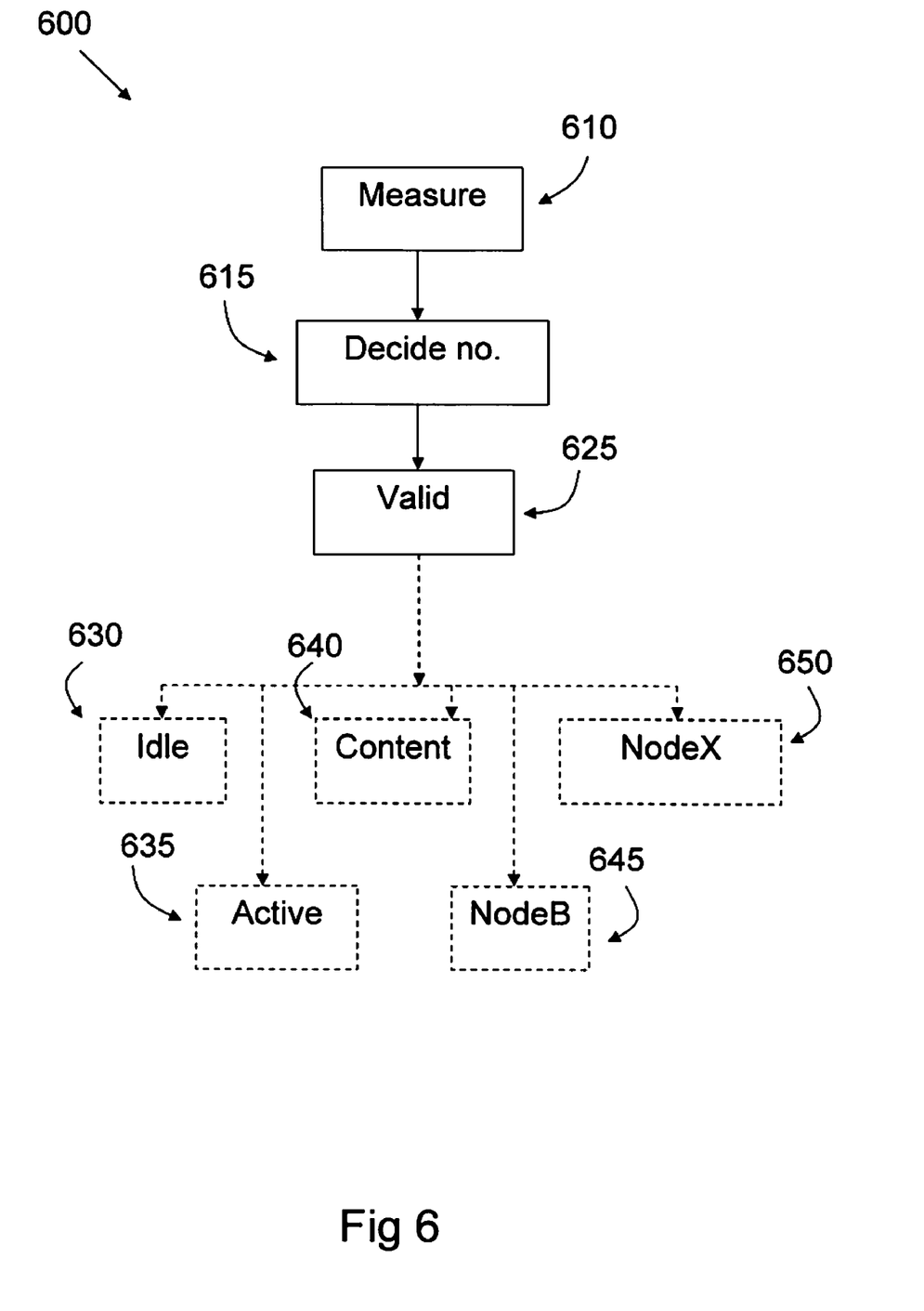
FIG. 6 shows a rough flow chart of a method of the invention.

FIG. 6 shows a rough flow chart of a method 600 of the invention. Steps which are options or alternatives have been indicated with dashed lines.

As shown in step 610, according to the invention, measurements are performed on pre-defined system indicators in at least a first cell in the system, and, as shown in step 615, based on the results of these measurements, a decision is made to vary the number of available down link sub-frames which are used by a first node such as an eNodeB for the transmission of down link traffic in said down link radio frames, a decision which, as shown in step 625, is valid for a certain amount of time.

As shown in step 640, the decision may also comprise varying the content of the down link sub-frames which are used.

Step 645 illustrates that the "varying" decision may be made autonomously by said first node, including the length of the validity of the decision, and step 650 shows that, alternatively, the results of the measurements are communicated to a central node ("RRM node") in the system, with the central node taking the varying decision, including its validity, and communicates the decision to the first node for implementation, Step 630 shows that the "varying decision" may comprise varying the number of used downlink sub-frames by declaring some of them "idle", i.e. that no transmission will take place in those sub-frames, and step 635 shows that the decision may also be to vary the number of used downlink sub-frames by means of declaring some of them "active", i.e. so that transmission will take place in previously idle sub-frames.

Figure 7:
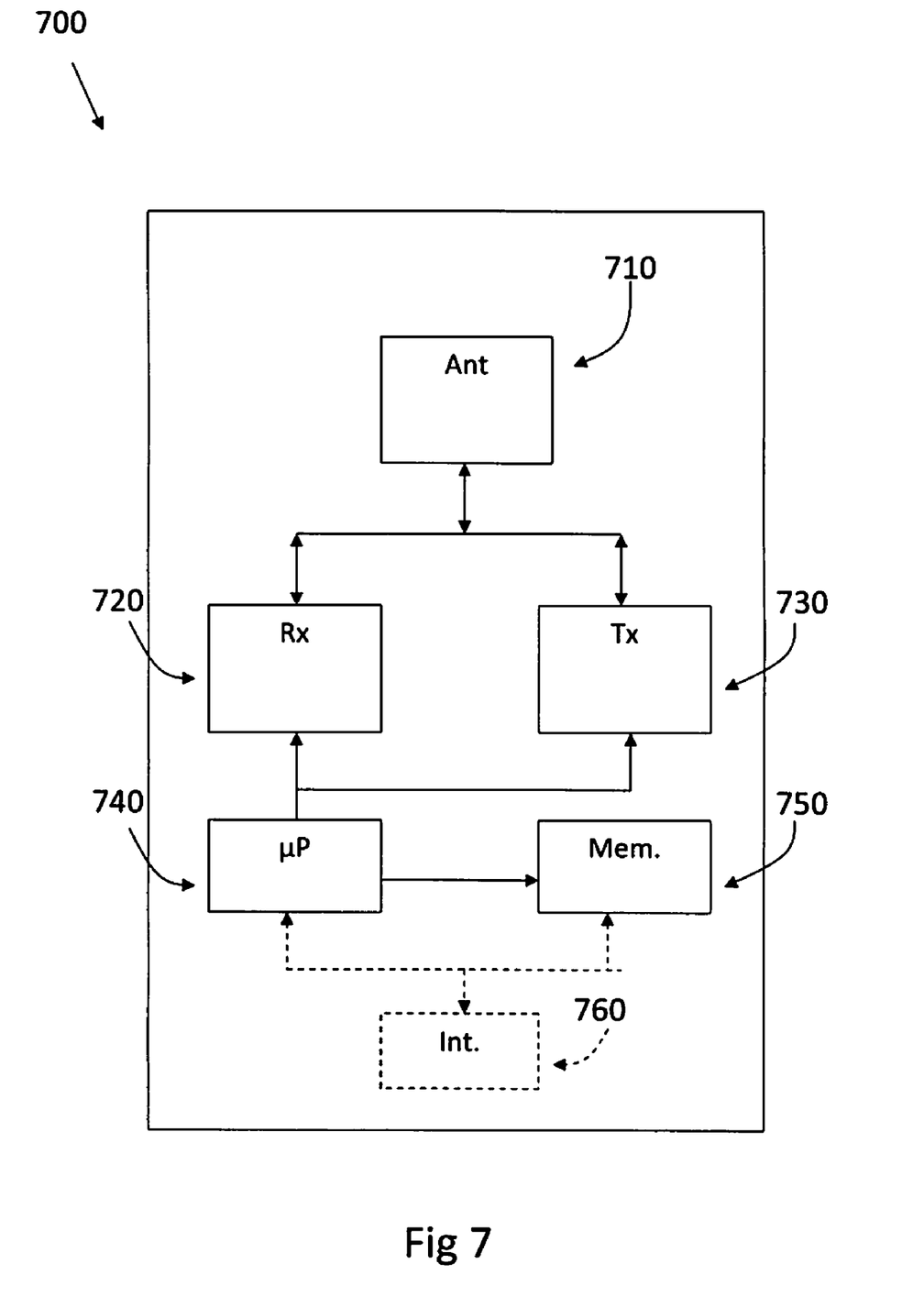
FIG. 7 shows a rough block diagram of a transceiver of the invention.

FIG. 7 shows a rough block diagram of a "base station" or a transceiver 700 of the invention, for use as a eNodeB as described above. As can be seen in FIG. 7, the eNodeB 700 of the invention comprises an antenna 710 for communicating with the UEs in one or more cell, and also comprises a transmitter 730 and a receiver 720. In addition, the eNodeB 700 also comprises control means such as for example a microprocessor 740, as well as comprising a memory 750. In addition, the transceiver 700 may comprise an interface, "Int", 760, towards a central node, such as an RRM node, in the system.

The transceiver 700 basically comprises means for functioning according to the method described above, and thus comprises means for controlling the traffic to and from user terminals in a cell. Suitably, those means comprise the antenna 710, the receiver 720, the transmitter 730, the control means 740 and the memory 750.

In addition, the transceiver 700 also comprising means for transmitting downlink traffic in radio frames, each of which comprises a certain number of sub-frames, said means suitably comprising the antenna 710 and the transmitter 730.

In addition, the transceiver comprises the control means 740 and the memory 750 which enable it to perform measurements on pre-defined system indicators in at least said first cell, and also comprises means such as, for example, the antenna 710, the transmitter 730, the control means 740 and the memory 750 for varying the number of available downlink sub-frames which are used for the transmission of downlink traffic in said downlink radio frames for a certain period of time.

The transceiver 700 may additionally use the controller 740 and the memory 750 for varying the content of the downlink sub frames which are used.

In one embodiment, the transceiver 700 additionally comprises means 760, i.e. the interface towards the central node such as an RRM node in the system, which allow the transmitter to transmit the results of the measurements to such a central node in the system, and to receive instructions from the central node regarding the varying, as well as the validity in time of said varying.

In another embodiment, the controller 740 and the memory 750 may also enable the transceiver to autonomously make the decision regarding said the, based on the measurements mentioned above.

The antenna 710, the transmitter 730 and the control means 740 may also be used by the transceiver 700 in order to vary the number of used downlink sub-frames by declaring some of them "idle", i.e. so that no transmission will take place in those sub-frames, and/or for varying the number of used downlink sub-frames by means of declaring some of them "active", i.e. that transmission will take place in previously idle sub-frames.

The measuring means, primarily the control means 740 and the memory 750 may also include among the pre-defined system indicators the system load in the cell, the system load in at least one other cell in the system, and/or the interference in the cell.

As has also emerged from the description above, the transceiver 700 will, if certain sub-frames aren't used for down link transmission, abstain from transmitting any of the following in said certain sub-frames:

The RSs should not be transmitted in the idle sub-frames.

No control signalling mapped to the channels SCH (any of the primary or secondary), PCH or PBCH will be sent.

No scheduling assignment for the downlink, with associated data, should be sent in the downlink.

No scheduling grant for the uplink should be sent in the downlink.

In addition, if some of the available down link sub-frames are not utilized for transmission, the transceiver does not schedule data in an uplink frame so that HARQ feedback will be expected in a DL idle sub-frame, and suitably, does not configure any UE to "wake up" from DRX during an idle DL sub-frame.

Also, if some available down link sub-frames will not be utilized for transmission, the inventive transceiver 700 does not configure any UE to listen to a "page" during an idle DL sub-frame.

The invention is not limited to the examples of embodiments described above and shown in the drawings, but may be freely varied within the scope of the appended claims.

The invention claimed is:

1. A method for use in a wireless communications system wherein a first node controls traffic to and from user terminals in a first cell of the system, and wherein the first node transmits downlink traffic in radio frames, each frame comprising a certain number of sub-frames, and wherein said method comprises:
   performing measurements on one or more pre-defined system indicators in at least said first cell; and
   varying the number of available downlink sub-frames which are used by the first node for transmission of downlink traffic, according to a decision made based on results of said measurements, wherein said decision is valid for a certain amount of time.

2. The method of claim 1, further comprising varying the content of the down link sub-frames which are used, according to said decision.

3. The method of claim 1, further comprising autonomously making said decision at said first node, including deciding for how long the decision is valid.

4. The method of claim 1, further comprising communicating the results to a central node in the system that makes said decision, and receiving said decision from the central node in return, for implementation of the decision by the first node.

5. The method of claim 1, wherein said varying comprises declaring one or more downlink sub-frames as downlink idle sub-frames, meaning that no downlink transmission by the first node will take place in those sub-frames.

6. The method of claim 1, wherein said varying comprises declaring one or more previously idle sub-frames as active, meaning that transmission will take place in those previously idle sub-frames.

7. The method of claim 1, wherein the one or more pre-defined system indicators include the system load in the first cell.

8. The method of claim 7, wherein the one or more pre-defined system indicators also include the system load in at least one other cell in the system.

9. The method of claim 1, wherein the one or more pre-defined system indicators include the interference in the first cell.

10. The method of claim 1, further comprising said first node abstaining from transmitting any of the following items in downlink idle sub-frames: reference symbols; control signaling mapped to the channels including Synch Channel (SCH), Physical Channel (PCH), or Physical Broadcast Channel (PBCH); downlink scheduling assignments; and scheduling grants for the uplink.

11. The method of claim 10, further comprising scheduling uplink data transmissions so that no data is scheduled in an uplink frame such that Hybrid Automatic Repeat Request (HARQ) feedback is expected in a downlink idle sub-frame.

12. The method of claim 10, further comprising configuring user terminals so that no user terminal is configured to wake up from discontinuous reception (DRX) during a downlink idle sub-frame.

13. The method of 10, further comprising configuring user terminals so that no user terminal is configured to listen to a page during a downlink idle sub-frame.

14. A transceiver for use as a first node in a wireless communications system and configured to control traffic to and from user terminals in a first cell of the system, wherein the transceiver is configured to transmit downlink traffic in radio frames, with each radio frame comprising a certain number of sub-frames, said transceiver comprising:
    a transmitter configured for wireless transmission to the user terminals, including transmission of said downlink traffic, and a receiver configured for wireless reception of uplink signals from the user terminals; and
    a control circuit operatively associated with the transmitter and receiver, and configured to perform measurements on one or more pre-defined system indicators in at least said first cell, and to vary the number of available downlink sub-frames which are used by the transceiver for transmission of downlink traffic, according to a decision made based on results of said measurements, wherein said decision is valid for a certain amount of time.

15. The transceiver of claim 14, wherein the control circuit is further configured to vary the content of the downlink sub frames which are used, according to said decision.

16. The transceiver of claim 14, wherein the transceiver is configured to transmit said results to a central node in the system, and to receive said decision in return from said central node, such that the transceiver varies the number of available downlink sub-frames according to the decision taken by the central node.

17. The transceiver of claim 14, wherein the transceiver is configured to make said decision autonomously, based on said results.

18. The transceiver of claim 14, wherein the control circuit is further configured to vary the number of used downlink sub-frames according to said decision, by declaring one or more downlink sub-frames as idle, meaning that no transmission will take place in those idle sub-frames.

19. The transceiver of claim 18, wherein the control circuit is further configured to vary the number of used downlink sub-frames according to said decision, by declaring one or more previously idle sub-frames as active, meaning that transmission will take place in those previously idle sub-frames.

20. The transceiver of claim 14, wherein the one or more pre-defined system indicators include the system load in the first cell.

21. The transceiver of claim 20, wherein the one or more pre-defined system indicators include the system load in at least one other cell in the system.

22. The transceiver of claim 21, wherein the one or more pre-defined system indicators include the interference in the first cell.

23. The transceiver of claim 14, wherein, for sub-frames that are not used for down link transmission, the transceiver is configured to abstain from transmitting any of the following items: reference symbols; control signaling mapped to the channels including Synch Channel (SCH), Physical Channel (PCH), or Physical Broadcast Channel (PBCH); downlink scheduling assignments; and uplink scheduling grants.

24. The transceiver of claim 23, wherein the transceiver is configured not to schedule data in an uplink frame such that Hybrid Automatic Repeat Request (HARQ) feedback would be expected in an idle downlink sub-frame.

25. The transceiver of claim 23, wherein the transceiver is configured not to configure any user terminal to wake up from discontinuous reception (DRX) during an idle downlink sub-frame.

* * * * *

UNITED STATES PATENT AND TRADEMARK OFFICE
CERTIFICATE OF CORRECTION

PATENT NO.         : 8,339,982 B2
APPLICATION NO.    : 12/679681
DATED              : December 25, 2012
INVENTOR(S)        : Tynderfeldt et al.

It is certified that error appears in the above-identified patent and that said Letters Patent is hereby corrected as shown below:

On the Title Page, item (75), under "Inventors", in Column 1, Line 2, delete "Osterling, Jarfalla" and insert -- Österling, Järfälla --, therefor.

On the Title Page, item (75), under "Inventors", in Column 1, Line 3, delete "Ekstrom," and insert -- Ekström, --, therefor.

In the Specification

In Column 1, Line 45, delete "frames." and insert -- frames --, therefor.

In Column 10, Lines 7-8, delete "implementation," and insert -- implementation. --, therefor.

In the Claims

In Column 11, Line 64, in Claim 6, delete "1," and insert -- 5, --, therefor.

In Column 12, Line 26, in Claim 13, delete "of 10," and insert -- of claim 10, --, therefor.

Signed and Sealed this
Sixteenth Day of July, 2013

Teresa Stanek Rea
*Acting Director of the United States Patent and Trademark Office*